United States Patent Office 2,776,314
Patented Jan. 1, 1957

2,776,314

METHYL FATTY TERTIARY AMINES

John G. Erickson, Minneapolis, Minn., assignor to General Mills, Inc., a corporation of Delaware No Drawing. Application February 23, 1954,
Serial No. 412,093

6 Claims. (Cl. 260—583)

This invention relates to a process of preparing tertiary amines of the type $R_nN(CH_3)_{3-n}$ in which R is a long chain aliphatic hydrocarbon group containing from 8 to 22 carbon atoms and $n$ is a positive integer not greater than two. The R groups may be alike or different.

Formaldehyde has been used in the past for the methylation of ammonia and amines. Eschweiler (Ber., 38, 880) (1905) and Koeppen (Ber., 38, 882) (1905) first described the methylation of ammonia and amines with formaldehyde. Sommelet et al. (Bull. Soc. Chim., [4], 35, 446) (1924) improved the process by using an excess of formic acid in combination with the formaldehyde. In this process the formic acid formed a salt with ammonia and served to carry out the necessary reduction step. The formaldehyde supplied the $CH_2$ groups for the future methyl groups. The reaction is indicated as follows:

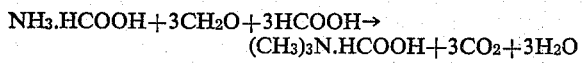

$$NH_3 \cdot HCOOH + 3CH_2O + 3HCOOH \rightarrow (CH_3)_3N \cdot HCOOH + 3CO_2 + 3H_2O$$

Clarke et al. (J. Am. Chem. Soc., 55, 4571) (1933) extended the formic acid-formaldehyde procedure to a variety of amines. Kirby (U. S. 2,366,534) extended the reaction to long chain tertiary amines.

There are, however, a number of limitations on the Kirby process which are evident from the reading thereof.

1. The patent stresses the danger of excessive foaming. Extreme care must be exercised in adjusting the temperature to avoid loss of product because of severe foaming. Experience with the Kirby procedure confirms the patentee's statements about foaming.

2. The patent states that the yields are 85 to 90% of theory.

3. The patentee recommends the use of an excess of at least five moles of formic acid per mole of primary amine. In the absence of such an excess the patentee states the reaction is likely to go out of control, become very viscous and difficult to stir and foams badly.

4. The patentee states that temperatures in excess of about 100° C. should be avoided so as to avoid side reactions that reduce the yield.

5. The reaction is noticeably exothermic.

It has now been discovered that it is possible to make a material improvement in the production of tertiary amines by using sufficient sulfuric acid in the reaction to form salts of the amines, instead of relying on the formic acid to form such salts. When this is done it is observed that numerous advantages are obtained.

1. There is no danger of foaming. A careful temperature control is not necessary.

2. Yields up to 95% or more can be obtained.

3. The process is cheaper. In the present process sulfuric acid replaces part of the formic acid; 1 lb. of sulfuric acid costing approximately 1 to 2¢ per pound takes the place of approximately 1 lb. of 90% formic acid costing 15¢ a pound. Moreover, in the present process it is not necessary to employ large excesses of formic acid. In the Kirby process the great excess of unused formic acid must either be lost or be recovered at considerable expense.

4. In the present process it is possible to use temperatures over 100° C. without impairing the yield while at the same time speeding up the reaction.

5. In the present process the reaction is not nearly so exothermic as is the Kirby process. There is no danger of an uncontrollable reaction and no need for cooling equipment of great capacity.

It is, therefore, an object of the present invention to provide a process of making tertiary amines of the above type by the reaction of fatty amines with formaldehyde and formic acid in the presence of sulfuric acid.

In carrying out the process, sufficient sulfuric acid is employed to fully neutralize the amine. Thus approximately 1 mol of sulfuric acid should be employed for each 2 mols of amine. It is preferred to use a 10 to 20% excess of sulfuric acid over the quantity required for the salt formation. This excess may be sulfuric acid or as an alternative, it is possible to substitute an equivalent amount of phosphoric acid for the excess of sulfuric acid. Certain advantages are attendant as use of the phosphoric acid as the excess. Yields are fully as good and the phosphoric acid serves additionally to check corrosion which may otherwise take place. Phosphoric acid, however, cannot be used to replace sulfuric acid as the salt forming acid since it causes excessive foaming.

It is desirable to employ small excesses of formaldehyde and of formic acid. These excesses are usually from 10 to 20% of the theoretical. It is possible to carry out the reaction without such an excess, but there is a tendency to reduce the yield and to reduce the purity of the product. At least 1 mol of formaldehyde and 1 mol of formic acid must be employed for each methyl group to be introduced into the amine product.

The formaldehyde may be used either in the form of aqueous formaldehyde or as para-formaldehyde. The formic acid is readily available in the form of 85 to 90% formic acid and this is fuly satisfactory since it is desirable to use water as a diluent or solvent in the reaction.

The amines which the present invention contemplate as starting materials are those which contain at least one long chain aliphatic hydrocarbon group containing from 8 to 22 carbon atoms. The invention contemplates the use of either primary fatty amines, or secondary fatty amines containing 2 fatty groups. These fatty groups may be saturated or unsaturated. The fatty amine starting materials may be composed of pure compounds, mixtures of primary fatty amines, mixtures of secondary fatty amines and mixtures of primary and secondary fatty amines.

Commercially fatty amines are derived from the fatty acids of fats or oils. Frequently these are composed of mixtures of amines derived from the whole mixed acids of a fat or oil or from some selected fraction of such acid. A typical fatty amine is the cocoamine of commerce which is derived from coconut oil and which contains fatty groups of from 8 to 18 carbon atoms, most of which are saturated, but some of which are unsaturated. This cocoamine contains both primary and secondary amines. The amine may be either distilled or undistilled, the distilled cocoamine containing a greater proportion of primary amines.

In carrying out the process, the order of mixing the reagents may be varied. However, it is preferred to mix the formaldehyde with the requisite amount of dilute sulfuric acid and then add the amine in portions. Finally the formic acid is added and this may be added all at once if desired.

The mixing of reagents may be done at any convenient temperature. The reaction will proceed even at room temperature or below over a very extended period of time. It is preferred to employ a reaction temperature of at least 50° C. Even at this temperature time periods up to 36 hours may be required whereas at 90 to 100° C. approximately 6 hours are required for substantial completion of the reaction, although yields can be improved somewhat further by longer heating. At 120° C. (under pressure) a shorter time of approximately 3 hours is adequate. A convenient method of avoiding both unduly long reaction times and excessively high pressure is to carry out the reaction in 2 stages, the first stage at 95° C. for 2 to 3 hours and the second stage at 110 to 120° C. under pressure for 2 to 3 hours. Completion of the reaction is indicated by the cessation in the evolution of carbon dioxide.

In the reaction mixture, the tertiary amine is present as the salt. It may be isolated by neutralizing with some strong base such as an alkali metal hydroxide or an alkaline earth metal hydroxide. The free amines are insoluble in water and may be easily separated from the aqueous inorganic salts formed during neutralization. They may be used without distillation or may be distilled if desired.

Example 1

Ninety-two and one-half parts of dodecylamine was added dropwise to a stirred mixture of 30.6 parts of 96% sulfuric acid, 100 parts of water and 97.9 parts of 37% aqueous formaldehyde solution. The temperature was held at 35 to 45° C. during the addition of amine. Sixty-one and three-tenths part of 90% formic acid was added and the mixture was refluxed at 85 to 98° for 14 hours. The mixture did not foam. The mixture was neutralized with sodium hydroxide solution, a low-boiling hydrocarbon solvent was added and the organic layer was washed with water. Distillation gave 103.9 parts of N,N-dimethyldodecylamine, B. P. 80–100° (0.1 mm.).

Example 2

Ninety-two and one-half parts of dodecylamine was added dropwise to a stirred mixture of 30.6 parts of 96% sulfuric acid, 100 parts of water, and 97.9 parts of 37% aqueous formaldehyde solution. The temperature was held at 35–45° C. during this addition. Sixty-two and eight-tenths parts of 88% formic acid was added in one portion and the mixture was heated two hours at 75–90° under atmospheric pressure and two and one-half hours at 110–120° C. under autogenous pressure. The mixture was neutralized with sodium hydroxide, a low boiling hydrocarbon solvent was added and the organic layer was washed with water. Distillation gave 101.3 g. of N,N-dimethyldodecylamine, B. P. 80° (0.07 mm.)–105° (0.15 mm.).

Example 3

Ninety-two and one-half parts of distilled cocoamine (containing 98% primary amine and 2% secondary amine) was added dropwise to a stirred mixture of 30.6 parts of 96% sulfuric acid, 100 parts of water and 97.9 parts of 37% formaldehyde solution. The temperature was kept below 50° C. After the addition of amine was complete, 62.8 parts of 88% formic acid was added in one portion and the mixture was heated at 75–98° C. for 10 hours. The mixture was neutralized with sodium hydroxide and filtered to remove a small amount of insoluble solid. The organic layer was separated, washed with water and distilled, giving 96.9 parts of methylated cocoamine, B. P. 55–155° (0.2 mm.).

Example 4

This was conducted similarly to Example 3, using the same reagents and quantities. The mixture was heated at 75–93° for two and one-half hours, then at 110–120° for three and one-half hours. The mixture was neutralized with sodium hydroxide and the organic layer was separated, washed with water, and distilled, giving 97.8 g. of methylated cocoamine, B. P. 70° (0.2 mm.)–160° (0.3 mm.).

Example 5

This was conducted similarly to Example 3, using the same reagents and quantities except that, in place of the distilled cocoamine 92.5 parts of undistilled cocoamine were used, containing 83% primary amines and 13% secondary amines. The mixture was heated at 75–93° for two and one-half hours, then under pressure at 110–120° for two and one-half hours. The mixture was neutralized with sodium hydroxide, a low-boiling hydrocarbon solvent was added, and the organic layer was separated and washed with water. Distillation gave 84.8 parts of methylated cocoamine, B. P. 55° (0.5 mm.)–180° (0.2 mm.). The residue consisted largely of methyldioctadecylamine; it was not distilled.

Example 6

One hundred and eighty-five parts of undistilled cocoamine, containing 83% primary amines and 13% secondary amines was added in portions to a stirred mixture of 51 parts of 96% sulfuric acid, 23.1 parts of 85% phosphoric acid, 100 parts of water and 195.8 parts of 37% formaldehyde solution. The mixture was held at 40–50° C. One hundred and twenty-five and six-tenths parts of 88% formic acid was added and the mixture was heated at reflux temperatures (85–100° C.) for 13 hours. It was neutralized with sodium hydroxide solution, the water layer was separated. The organic layer was mixed with a low-boiling hydrocarbon solvent, washed with water and distilled, giving 178 parts of methylated cocoamine, B. P. 65–180° (0.2 mm.) plus 15.2 parts of a higher boiling material, mostly methyldioctadecylamine.

I claim as my invention:

1. Process of producing tertiary amines having the following formula: $R_nN(CH_3)_{3-n}$ in which R is an aliphatic hydrocarbon group containing from 8 to 22 carbon atoms and $n$ is a positive integer not greater than 2 which comprises reacting 1 mol of the amine $R_nNH_{3-n}$ with at least $3-n$ mols of formaldehyde and of formic acid in the presence of at least one equivalent of sulfuric acid per mol of amine.

2. Process of producing tertiary amines having the following formula: $R_nN(CH_3)_{3-n}$ in which R is an aliphatic hydrocarbon group containing from 8 to 22 carbon atoms and $n$ is a positive integer not greater than 2 which comprises reacting 1 mol of the amine $R_nNH_{3-n}$ with from 10 to 20% excess of the $3-n$ theoretical mols of formaldehyde and of formic acid required for methylation, in the presence of at least one equivalent of sulfuric acid per mol of amine.

3. Process of producing tertiary amines having the following formula: $R_nN(CH_3)_{3-n}$ in which R is an aliphatic hydrocarbon group containing from 8 to 22 carbon atoms and $n$ is a positive integer not greater than 2 which comprises reacting 1 mol of the amine $R_nNH_{3-n}$ with from 10 to 20% excess of the $3-n$ theoretical mols of formaldehyde and formic acid required for methylation, in the presence of from 1.10 to 1.20 equivalents of sulfuric acid per mol of amine.

4. Process of producing tertiary amines having the following formula: $R_nN(CH_3)_{3-n}$ in which R is an aliphatic hydrocarbon group containing from 8 to 22 carbon atoms and $n$ is a positive integer not greater than 2 which comprises reacting 1 mol of the amine $R_nNH_{3-n}$ with from 10 to 20% excess of the $3-n$ theoretical mols of formaldehyde and formic acid required for methylation, in the presence of substantially 1 equivalent of sulfuric acid and approximately one-tenth to two-tenths equivalent of phosphoric acid per mole of amine.

5. Process according to claim 2 in which the reaction is carried out at temperatures within the range of 50 to 100° C. for from 6 to 36 hours.

6. Process according to claim 2 in which the reaction is carried out at approximately 95° C. for from 2 to 3 hours and then at 110 to 120° for from 2 to 3 hours.

References Cited in the file of this patent

UNITED STATES PATENTS

| | | |
|---|---|---|
| 2,366,534 | Kirby | Jan. 2, 1945 |

FOREIGN PATENTS

| | | |
|---|---|---|
| 464,856 | Canada | May 2, 1950 |